United States Patent [19]

Madden, Jr.

[11] Patent Number: 5,619,820

[45] Date of Patent: Apr. 15, 1997

[54] BRACKET APPARATUS FOR VEHICLE DOORS HAVING NO UPPER WINDOW FRAME

[76] Inventor: James R. Madden, Jr., 4410 W. Acoma Dr., Glendale, Ariz. 85306

[21] Appl. No.: 599,750

[22] Filed: Feb. 12, 1996

[51] Int. Cl.[6] ............................................. E06B 9/00
[52] U.S. Cl. ........................ 49/50; 49/61; 49/502
[58] Field of Search ......................... 49/58, 502, 61; 109/495

[56] References Cited

U.S. PATENT DOCUMENTS 3,855,898  12/1974  McDonald ................. 109/49.5 X
5,370,035  12/1994  Madden, Jr. ............... 109/49.5 X
5,413,026   5/1995  Madden, Jr. ............... 109/49.5 X
5,438,908   8/1995  Madden, Jr. ............... 109/49.5 X

*Primary Examiner*—Philip C. Kannan

[57] ABSTRACT

Support apparatus for supporting a transparent bullet resistant panel on a door having no frame for its window includes channel elements for holding the transparent panel and support elements including brackets secured to the channel elements and disposed against the inside of the door and support elements extending downwardly within the door. Different embodiments of brackets are disclosed.

6 Claims, 3 Drawing Sheets

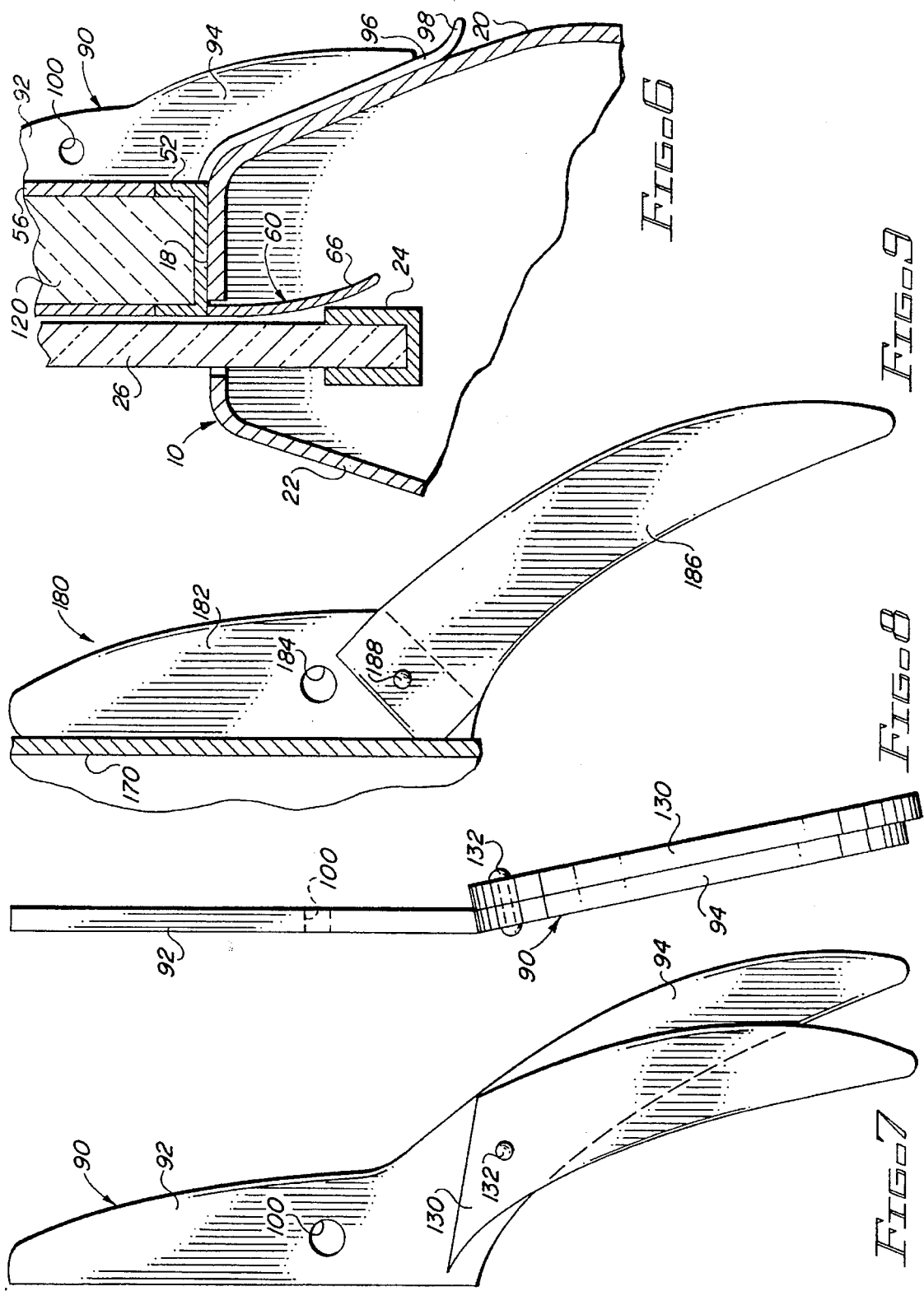

BRACKET APPARATUS FOR VEHICLE DOORS HAVING NO UPPER WINDOW FRAME

BACKGROUND OF THE INVENTION

1. Field of the Invention

This invention relates to bullet resistant apparatus for vehicle door windows and, more particularly, to bracket apparatus for supporting a transparent bullet resistant panel for a vehicle door having no upper window frame.

2. Description of the Prior Art

U.S. Pat. No. 5,271,311, the inventor of which is the inventor herein, describes removable bulletproof apparatus for vehicles, and the door for the vehicle includes a frame around the window. A transparent panel is secured to the door at the frame around the window. A flexible curtain extends downwardly over the door beneath the window. Several different embodiments of structural elements for holding the transparent panel are disclosed.

U.S. Pat. No. 5,370,035 is a continuation-in-part of the '311 patent. Substantially the same structure with respect to the door is disclosed. Again, the vehicle door includes a frame around the window!, and the transparent bulletproof or bullet resistant panel is secured by structural elements disposed in the window frame of the vehicle door.

U.S. Pat. No. 5,413,026 is a division of the '035 patent, and discloses substantially the same structural elements with respect to the door, the door window, and the frame of the vehicle door about the window.

U.S. Pat. No. 5,438,908 comprises a division of the '035 patent, and accordingly discloses substantially the same structural elements.

U.S. Pat. No. 3,855,898 (McDonald) discloses an armored vehicle which includes a door, a window in the door, and the elements for essentially armoring the vehicle, including the door. The door includes a frame about the window.

There are many vehicles which include doors having no frames about the upper portions of the windows. The doors include windows extending upwardly from the doors and no frames for supporting the windows above the doors. Accordingly, apparatus disclosed in the above patents are not relevant or applicable to such vehicles windows.

The apparatus of the present invention discloses support structure for supporting a transparent, bullet resistant panel for vehicle windows in which the doors have no upper window frames above the doors.

SYSTEM OF THE INVENTION

The invention described and claimed herein comprises bracket apparatus for supporting a transparent bullet resistant panel for vehicle doors in which the doors have no frames for their windows. The bracket apparatus includes channel elements on the bottom, front side, and rear side for receiving the transparent bullet resistant panel, and inner bracket elements extending downwardly from the bottom channel and disposed within the door, and outer bracket secured to the channel elements and disposed against the inside of the door. The inside door brackets includes pads to help spread the support load against the inside of the door.

Among the objects of the present invention are the following:

To provide new and useful support apparatus for supporting a transparent, bullet resistant panel on a door having no frame for its window;

To provide new and useful bracket apparatus for supporting a transparent, bullet resistant panel in a door without a window frame above the door;

To provide new and useful bracket apparatus for supporting a transparent bullet resistant panel including channel elements for holding the bottom and sides of a transparent panel and bracket elements extending downwardly beneath the channels for supporting the channels and the bullet resistant panel against structural elements of the door;

To provide new and useful bracket apparatus for a transparent bullet resistant panel having bracket elements extending into the door and on the inner side of the door; and To provide new and useful bracket apparatus for supporting a transparent panel on a door without a window frame including bracket elements extending downwardly from a support frame for the transparent panel and into the door and adjustable brackets disposed against the inside of the door.

BRIEF DESCRIPTION OF THE DRAWING

FIG. 4 is a view taken generally along line 4—4 of FIG.

FIG. 5 is a view taken generally along line 5—5 of FIG.

FIG. 6 is a view in partial section taken generally along line 6—6 of FIG. 1.

FIG. 7 is a side view of an alternate embodiment of a portion of the apparatus of the present invention.

FIG. 8 is an end view of the apparatus of FIG. 7.

FIG. 9 is a side view of an alternate embodiment of a portion of the apparatus of the present invention.

DESCRIPTION OF THE PREFERRED EMBODIMENT

Figure 1:
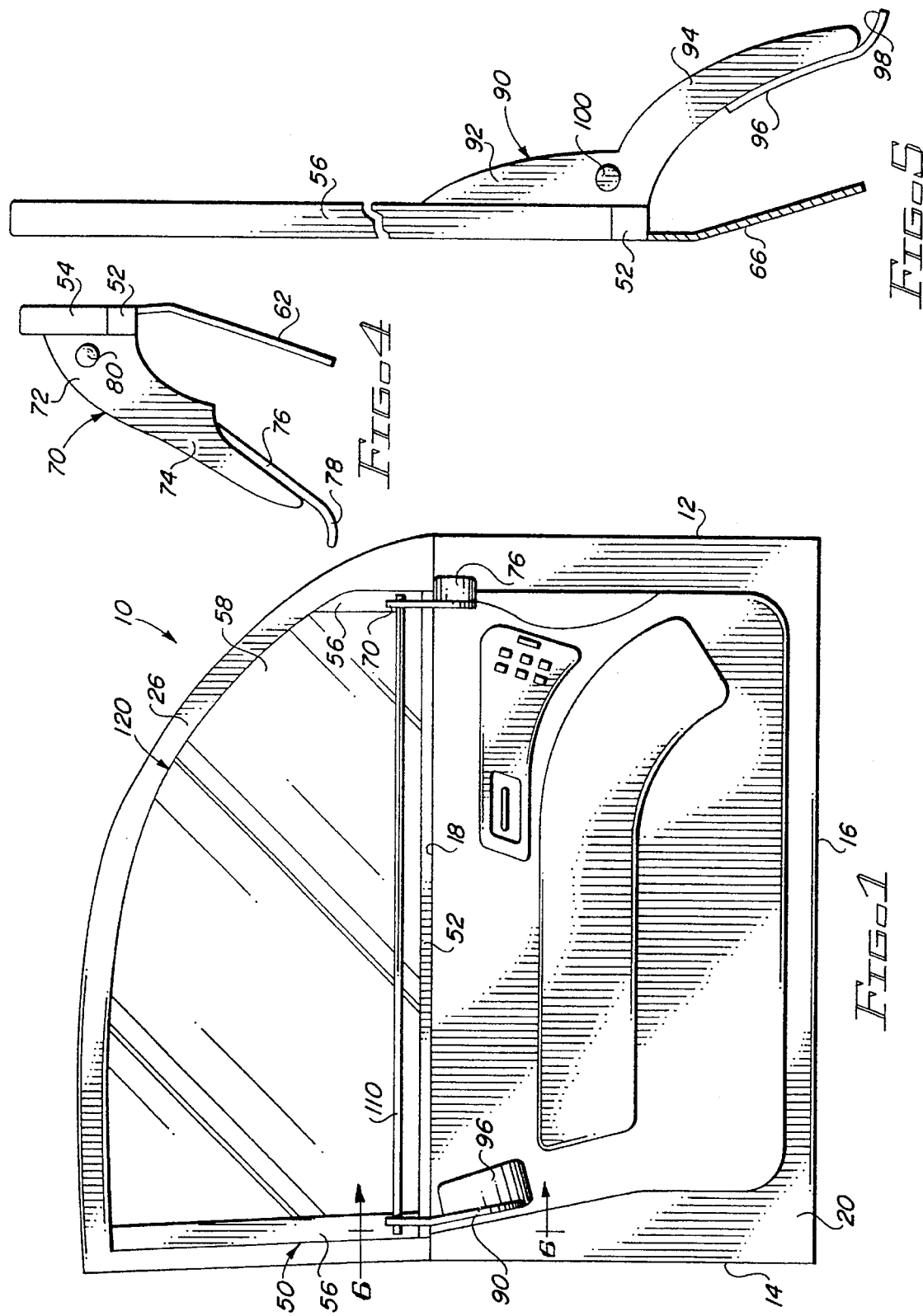
FIG. 1 is a plan view of a vehicle door with the apparatus of the present invention secured thereto.

FIG. 1 comprises a plan view of the inside of a door 10 for a vehicle. The door 10 includes a front portion 12, a rear portion 14, a bottom 16, and a top sill 18. The door 10 comprises a front door of a vehicle (not shown) The door includes an inside 20, and an outside 22 (see FIG. 6). A window extends upwardly from the door 10. Bracket apparatus 50 of the present invention is appropriately secured to the door 10 for supporting a transparent, bullet resistant window panel 120. The panel 120 is disposed adjacent to the window 26 and above the structural elements of the door 10.

Figure 2:
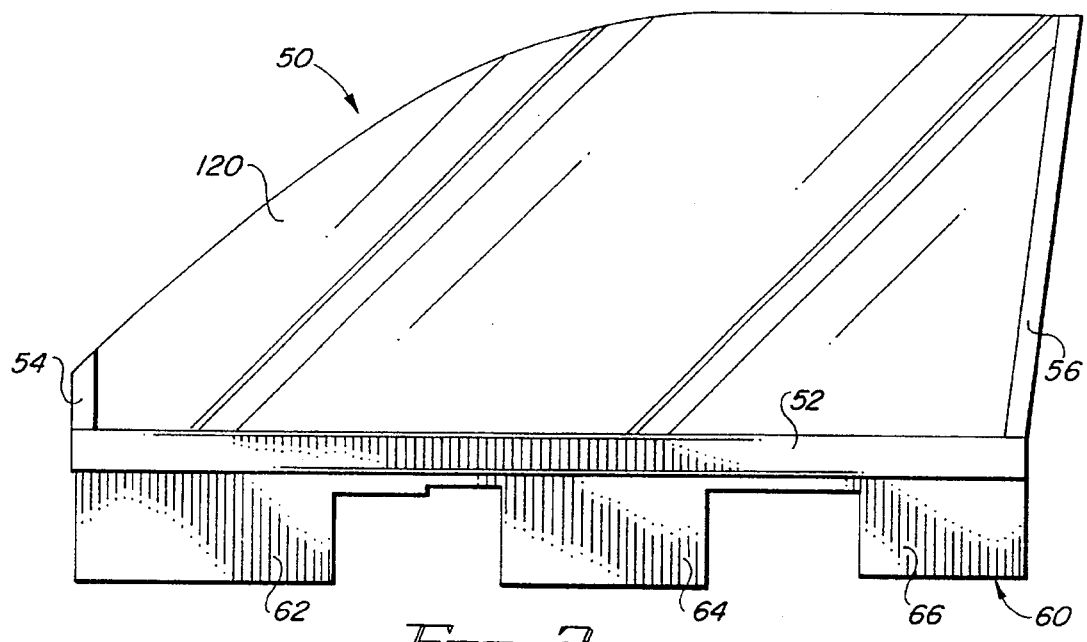
FIG. 2 is a plan view of the apparatus of the present invention.
Figure 3:
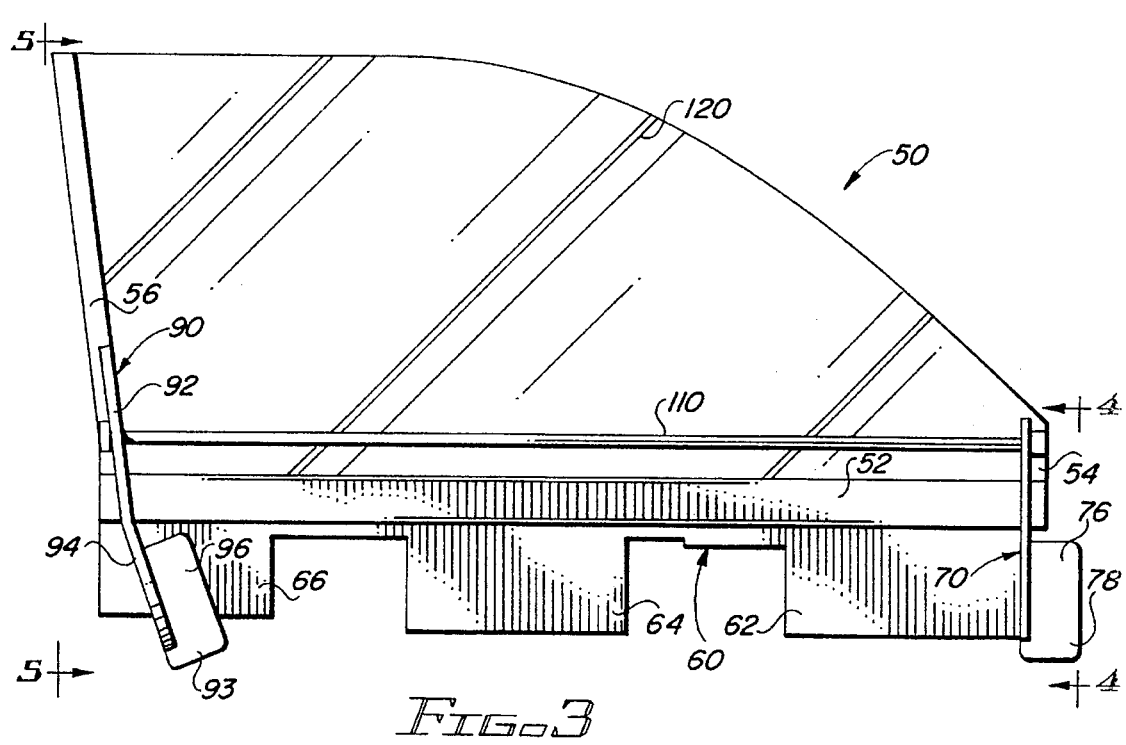
FIG. 3 is a plan view of the reverse of the apparatus of the present invention from that shown in FIG. 2.

FIG. 2 comprises a plan view of the apparatus 50 from the "outside" and FIG. 3 comprises a view of the apparatus 50 from the "inside." The terms "outside" and "inside" refer to the orientation of the apparatus 50 relative to the door 10 and its window 26. For the following discussion, reference will primarily be made to FIGS. 1, 2, and 3.

For supporting the bullet resistant transparent window panel 120, three channel members or elements 52, 54, and 56 are used. The channel element 52 comprises a bottom or base channel element, the channel element 54 extends upwardly from the channel element 52 at the "front" of the apparatus. The channel element 56 is also secured to the bottom channel element 52 and extends upwardly therefrom at the "rear" of the apparatus 50. Due to the configuration of the window 26 and of the door 10, the front channel element 54 is substantially shorter than the rear channel element 56.

Two different types of support bracket elements or members are used in the apparatus of the present invention, and which bracket elements, or support plates, extend downwardly from the channel elements. A bottom inner bracket 60 is shown in FIGS. 2 and 3 extending downwardly from the channel 52, and two different types of bracket elements 70 and 90 are shown in FIG. 3. The bracket elements 70 and 90 are not shown in FIG. 2 for purposes of clarity. The channel elements 70 and 90 are disposed against the "inside" of the door 10.

The bracket 60 comprises a bottom inner support bracket and includes generally three spaced apart portions, including a front portion 62, a center portion 64, and a rear portion 66. The three portions are spaced apart from each other and vary in their size. They are designed to be disposed within the door 10, as best shown in FIG. 6, and they are spaced apart so as to not interfere with various structural and mechanical elements inside the door 10. This is shown and will be discussed in more detail in conjunction with FIG. 6.

The bracket elements 70 and 90 comprises outer elements in that they are disposed not within the door, as with the inner bracket 60, but rather against the door on the inside of the door. The term "outer" may be confusing with respect to the brackets 70 and 90, since they are actually disposed against the inner portion of the door, but with respect to the brackets 60, 70, and 90, the term "outer" simply means that the bracket elements 70 and 90 are not disposed within but rather against, the door 10.

FIGS. 4 and 5 comprise side views of the outer brackets 70 and 90, respectively. FIGS. 4 and 5 are taken generally along lines 4—4 and 5—5 of FIG. 3, respectively. For the following discussion, reference will be made primarily to FIGS. 4 and 5, and reference may also be made to FIGS. 1, 2, and 3.

The front outer bracket 70 is shown best in FIG. 4 appropriately secured as by welding, to the front channel 54. The bracket 70 includes an upper portion 72, and a lower portion 74. A pad 76 is appropriately secured, as by welding, to the lower portion 74. The pad 76 includes an outwardly curved lower portion 78. The curved lower portion 78 helps in assembling the apparatus 50 to the door 10. The purpose of the pad 76 is to spread the supporting force on the inside 20 of the door 10. See FIG. 1.

The bracket 70 is generally straight, while the bracket 90, as may be understood from FIGS. 1 and 3, is slightly curved or bent. The bracket 90 includes an upper portion 92 and a lower portion 94. A pad 96 is appropriately secured to the lower portion 94, as by welding. The pad 96 also includes an outwardly curved lower portion 98 to aid in assembling the apparatus 50 to the inside 20 of the door 10.

FIGS. 4 and 5 show the angular orientation of the various bracket elements, such as the bracket element 62 and the bracket 70 in FIG. 4 and the bracket elements 66 and 90 of FIG. 5.

The bracket 70 includes an aperture 80 extending through the upper portion 72, and the bracket 90 includes an aperture 100 extending through its upper portion 92. A rod 110, shown in FIGS. 1 and 3, extends through and is appropriately secured to the brackets 70 and 90 at the apertures 80 and 100, respectively. The purpose of the rod 110 is for supporting a flexible curtain, not shown, but as shown in the '026 patent discussed above.

FIG. 6 comprises a view in partial section through the door 10 and taken generally along lines 6—6 of FIG. 1.

Various structural elements associated with the door 10 and the apparatus of the present invention are shown in partial section in FIG. 6, such as the inside 20, the outside 22, the window 26 and some of its associated elements, and structural elements 24 within the door. The lower portion 66 of the bottom inner bracket 60 is shown disposed against structural element 24, and the pad 96, secured to the lower portion 94 of the bracket 90, is shown disposed against the inside 20 of the door 10.

It will be understood that the configurations of doors vary from vehicle model to vehicle model. Accordingly, the specific structural orientation and details of the inner bracket 60, and its various portions, will be appropriately configured for a specific vehicle door. Similarly, the configuration of the outer brackets 70 and 90 will also be configured for specific door applications.

FIG. 7 comprises a side view of an alternate embodiment of the bracket 90 in which an alternate adjustable bracket portion 130 is pivotally secured by a fastener 132 to the lower portion 94.

FIG. 8 comprises an end view of the bracket 90 showing the adjustable bracket portion 130 secured thereto. Under some circumstances, an adjustable bracket portion such as the bracket portion 130, may be advantageous.

It will be noted that the pad 96 has been omitted from the embodiment of FIGS. 7 and 8.

The use of the adjustable pad portion 130 allows for differences in the inside 20 from vehicle to vehicle with minimum expense and with great flexibility. On the other hand, for complete flexibility in a bracket, an embodiment such as shown in FIG. 9 may be advantageous. FIG. 9 comprises a side view of a bracket 180 which includes a fixed upper portion 182 which is schematically illustrated as secured to a channel element 170, and a fully adjustable lower portion 186.

The upper portion 182 includes an aperture 184, through which the rod 110 may extend for securing the rod 110 to the bracket 180. The lower portion 186 is pivotally secured to the fixed portion 182 by an appropriate fastener element 188.

The lower, adjustable bracket portion 186 may be disposed, as desired, against the inner portion of the door 20 (see FIGS. 1 and 6) as desired. The lower portion 186 may, of course, include a pad, such as the pad 96, discussed above in conjunction with the bracket 90.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Bullet resistant window apparatus for a vehicle door having a sill, a window extending above the sill, and having no frame for the window above the sill comprising in combination:

a bottom channel to be disposed on the sill for receiving the bottom portion of a bullet resistant window panel;

a first side channel secured to the bottom channel for receiving the first side portion of the bullet resistant window panel;

a second side channel secured to the bottom channel for receiving a second side portion of the bullet resistant window panel;

inner support means secured to the bottom channel and extending downwardly to be disposed within the door below the window;

a first outer bracket secured to the first side channel and extending downwardly therefrom to be disposed against the door;

a second outer bracket secured to the second side channel and extending downwardly therefrom to be disposed against the door; and a bullet resistant window panel disposed in the bottom channel and in the first and second side channels.

2. The apparatus of claim 1 in which the bullet resistant window panel is transparent.

3. The apparatus of claim 1 in which the inner support means includes a plurality of panel elements spaced apart from each other.

4. The apparatus of claim 1 in which the first and second outer brackets are also secured to the bottom channel.

5. The apparatus of claim 1 in which the first outer bracket includes a first portion and a second portion pivotally secured to the first portion to be disposed against the door.

6. The apparatus of claim 5 in which the second outer bracket includes a first portion and a second portion pivotally secured to the first portion to be disposed against the door.

* * * * *